(12) United States Patent
Colombo et al.

(10) Patent No.: US 11,454,461 B2
(45) Date of Patent: Sep. 27, 2022

(54) APPARATUS AND METHOD FOR PROTECTING THE TUBE-SHEET OF A SYNGAS LOOP BOILER

(71) Applicant: ALFA LAVAL CORPORATE AB, Lund (SE)

(72) Inventors: Marco Colombo, Monza (IT); Silvio Sarti, Dalmine (IT)

(73) Assignee: ALFA LAVAL CORPORATE AB, Lund (SE)

( * ) Notice: Subject to any disclaimer, the term of this patent is extended or adjusted under 35 U.S.C. 154(b) by 181 days.

(21) Appl. No.: 16/470,181

(22) PCT Filed: Jan. 18, 2018

(86) PCT No.: PCT/EP2018/051193
§ 371 (c)(1),
(2) Date: Jun. 14, 2019

(87) PCT Pub. No.: WO2018/141556
PCT Pub. Date: Aug. 9, 2018

(65) Prior Publication Data
US 2020/0003503 A1     Jan. 2, 2020

(30) Foreign Application Priority Data

Jan. 31, 2017 (EP) .................................. 17425012

(51) Int. Cl.
*F28F 9/18* (2006.01)
*C01B 3/02* (2006.01)
(Continued)

(52) U.S. Cl.
CPC .............. *F28F 9/185* (2013.01); *C01B 3/025* (2013.01); *F28D 7/06* (2013.01); *F28F 21/00* (2013.01);
(Continued)

(58) Field of Classification Search
CPC .......... F28F 9/185; F28F 21/00; F28F 21/089; F28F 2225/08; F28F 2245/00;
(Continued)

(56) References Cited

U.S. PATENT DOCUMENTS 2,047,633 A * 7/1936 Jacobus ................ F16L 41/084
122/DIG. 16
2,145,877 A * 2/1939 Houdry .................. B01J 8/0207
422/198
(Continued)

FOREIGN PATENT DOCUMENTS

CN      101285795 A     10/2008
CN      201407945 Y     2/2010
(Continued)

OTHER PUBLICATIONS

EP 0780656 A2 mt (Year: 1997).*
(Continued)

*Primary Examiner* — Gordon A Jones
(74) *Attorney, Agent, or Firm* — Birch, Stewart, Kolasch & Birch, LLP (57) ABSTRACT

A syngas loop boiler includes a casing that surrounds a tube bundle, wherein the tube bundle includes a plurality of tubes. One end of each of the tubes is joined to a tube-sheet provided with corresponding tube-sheet inlet holes for inletting the syngas in the boiler, wherein each tube-sheet inlet hole is internally provided with at least a protective sleeve welded at both ends to corresponding surfaces of the tube-sheet inlet hole. Each tube-sheet inlet hole is provided with a first respective weld overlay placed at the inlet mouth of the tube-sheet inlet hole, so that a first end of each protective sleeve is welded to the first weld overlay. Each tube-sheet inlet hole is internally provided with at least a bore groove that contains a respective in-bore second weld overlay, so that the second end of the protective sleeve is welded to the (Continued)

in-bore second weld overlay. Each protective sleeve is thus welded at both ends to respective weld overlays, with the possibility of removal and re-installation without performing any post weld heat treatment.

16 Claims, 6 Drawing Sheets

(51) Int. Cl.
 F28D 7/06 (2006.01)
 F28F 21/00 (2006.01)
 F28F 21/08 (2006.01)
 F28D 21/00 (2006.01)

(52) U.S. Cl.
 CPC .... *F28F 21/089* (2013.01); *F28D 2021/0075* (2013.01); *F28F 2225/08* (2013.01); *F28F 2245/00* (2013.01); *F28F 2265/02* (2013.01); *F28F 2265/10* (2013.01)

(58) Field of Classification Search
 CPC .. F28F 2265/02; F28F 2265/10; F28F 19/002; F28F 9/0229; C01B 3/025; F28D 7/06; F28D 2021/0075; F28D 21/00
 See application file for complete search history.

(56) References Cited

U.S. PATENT DOCUMENTS

| | | | | |
|---|---|---|---|---|
| 2,743,089 A * | 4/1956 | Gardner | F28F 9/0229 | |
| | | | 165/109.1 | |
| 2,785,459 A | 3/1957 | Carpenter | | |
| 3,317,222 A * | 5/1967 | Maretzo | F28F 9/182 | |
| | | | 285/55 | |
| 3,540,529 A | 11/1970 | Umino et al. | | |
| 4,071,083 A * | 1/1978 | Droin | B23K 35/004 | |
| | | | 165/173 | |
| 4,182,408 A * | 1/1980 | Laber | F28F 9/0229 | |
| | | | 29/523 | |
| 4,401,153 A * | 8/1983 | Marsch | F28F 9/0229 | |
| | | | 165/158 | |
| 4,579,171 A * | 4/1986 | Stafford | F28F 9/182 | |
| | | | 228/183 | |
| 5,094,801 A * | 3/1992 | Dixon | G21C 1/09 | |
| | | | 29/890.036 | |
| 5,246,063 A * | 9/1993 | Fix | F28F 21/04 | |
| | | | 165/133 | |
| 5,271,048 A * | 12/1993 | Behnke | G21C 13/036 | |
| | | | 228/119 | |
| 5,274,683 A * | 12/1993 | Broda | G21C 13/036 | |
| | | | 376/307 | |
| 5,404,382 A * | 4/1995 | Russ | G21C 13/036 | |
| | | | 376/260 | |
| 5,472,046 A * | 12/1995 | Brucher | F28D 7/005 | |
| | | | 165/134.1 | |
| 5,570,741 A * | 11/1996 | Brucher | F28F 9/0229 | |
| | | | 122/512 | |
| 5,775,269 A * | 7/1998 | Lawrence | F22B 37/08 | |
| | | | 122/511 | |
| 5,809,098 A * | 9/1998 | Deaver | G21C 13/036 | |
| | | | 376/203 | |
| 6,334,483 B1 * | 1/2002 | Berglund | C09C 1/50 | |
| | | | 165/134.1 | |
| 6,834,092 B2 * | 12/2004 | Willis | G21C 13/036 | |
| | | | 376/292 | |
| 7,206,372 B2 * | 4/2007 | Willis | G21C 13/036 | |
| | | | 376/292 | |
| 7,574,981 B1 | 8/2009 | Schulz | | |
| 7,763,215 B2 * | 7/2010 | Sakai | F28F 9/0219 | |
| | | | 422/187 | |
| 8,210,245 B2 | 7/2012 | Gillessen et al. | | |
| 8,867,688 B2 * | 10/2014 | Hori | G21C 13/036 | |
| | | | 376/204 | |
| 9,180,557 B1 * | 11/2015 | Graves | B23K 31/02 | |
| 9,435,481 B2 * | 9/2016 | Bienentreu | F22B 37/107 | |
| 9,978,467 B2 * | 5/2018 | Graves | G21C 17/017 | |
| 10,006,719 B2 * | 6/2018 | Telgen | F28F 19/002 | |
| 2003/0192680 A1 * | 10/2003 | Blanda, Jr. | F28F 21/082 | |
| | | | 165/134.1 | |
| 2006/0078080 A1 * | 4/2006 | Payne | G21C 13/036 | |
| | | | 376/204 | |
| 2007/0031591 A1 * | 2/2007 | Junker | C23C 24/04 | |
| | | | 427/140 | |
| 2008/0105341 A1 * | 5/2008 | Huff | B32B 15/015 | |
| | | | 148/622 | |
| 2008/0202732 A1 | 8/2008 | Gillessen et al. | | |
| 2011/0194663 A1 | 8/2011 | Hori et al. | | |
| 2013/0199462 A1 | 8/2013 | Bienentreu et al. | | |
| 2017/0044983 A1 * | 2/2017 | Duesler | F02C 7/185 | |

FOREIGN PATENT DOCUMENTS

| | | | |
|---|---|---|---|
| CN | 101966627 A | 2/2011 | |
| CN | 102967169 A | 3/2013 | |
| CN | 204730723 U | 10/2015 | |
| EP | 0780656 A2 * | 6/1997 | F28F 9/185 |
| JP | 63-294493 A | 12/1988 | |
| JP | 4-203800 A | 7/1992 | |
| JP | 8-29090 A | 2/1996 | |
| JP | 9-170896 A | 6/1997 | |
| WO | WO 2009/066260 A1 | 5/2009 | |
| WO | WO 2013/165247 A1 | 11/2013 | |

OTHER PUBLICATIONS

Japanese Office Action, dated Aug. 3, 2020, for Japanese Application No. 2019-540571, with an English translation.
International Search Report for PCT/EP2018/051193 (PCT/ISA/210) dated Mar. 26, 2018.
Written Opinion of the International Searching Authority for PCT/EP2018/051193 (PCT/ISA/237) dated Mar. 26, 2018.
English translation of the Chinese Office Action and Search Report, dated Apr. 13, 2020 for Chinese Application No. 201880009275.8.

* cited by examiner

APPARATUS AND METHOD FOR PROTECTING THE TUBE-SHEET OF A SYNGAS LOOP BOILER

BACKGROUND OF THE INVENTION

The present invention refers to an apparatus and a method for protecting the tube-sheet of a syngas loop boiler. More precisely, the present invention refers to an interchangeable welded sleeve for protecting the tube-sheet of an ammonia syngas loop boiler, as well as to a method for inserting and welding a protective sleeve in the tube-sheet of an ammonia syngas loop boiler.

As is known, syngas, or synthesis gas, is a gas mixture comprising primarily hydrogen, carbon monoxide, ammonia and very often some carbon dioxide. The name comes from its use as intermediates in creating synthetic natural gas (SNG) for producing ammonia or methanol.

Syngas can be produced from many sources, including natural gas, coal, biomass, or virtually any hydrocarbon feedstock, by reaction with steam (steam reforming), carbon dioxide (dry reforming) or oxygen (partial oxidation). Syngas is a crucial intermediate resource for production of hydrogen, ammonia, methanol, and synthetic hydrocarbon fuels. Syngas is also used as an intermediate in producing synthetic petroleum for use as a fuel or lubricant via the Fischer-Tropsch process and previously the Mobil methanol to gasoline process. Production methods include steam reforming of natural gas or liquid hydrocarbons to produce hydrogen, the gasification of coal, biomass, and in some types of waste-to-energy gasification facilities.

Figure 1:
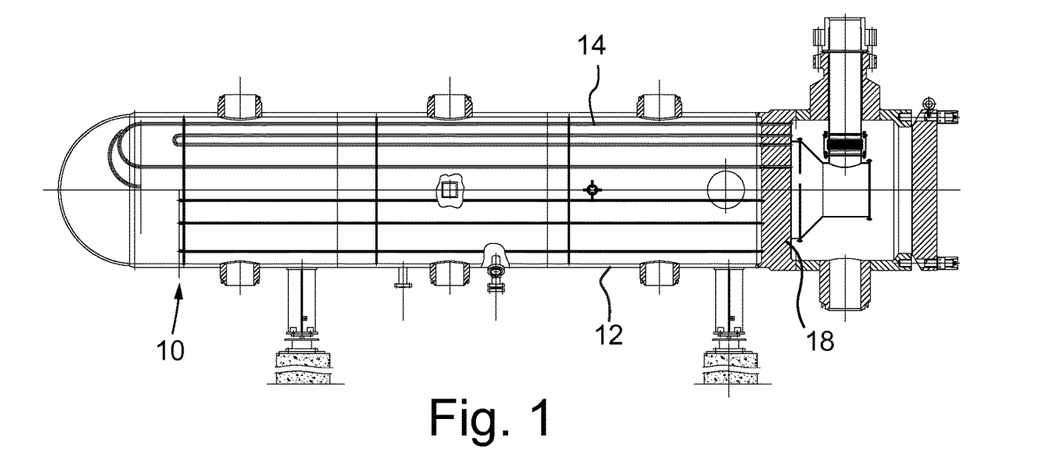
FIG. 1 is a schematic view of a syngas loop boiler with horizontally arranged tube bundle.

A syngas loop boiler is a pressure equipment installed in an ammonia production plant directly downstream the ammonia converter. The syngas loop boiler is internally provided with a horizontally or vertically arranged tube bundle joined to a tube-sheet. A typical syngas loop boiler layout, with a horizontally arranged tube bundle, is shown for example in FIG. 1.

Syngas, typically being a mixture of 55% $H_2$, 20% $NH_3$, 6% $CH_4$, 15% $N_2$, He+Ar balance, enters the syngas loop boiler tube-sheet at high temperature (usually 400-480° C.) and pressure (about 10-20 MPa). A conventional syngas loop boiler can be manufactured, for example, with a grade 22 ferritic steel (2.25Cr-1Mo). In a conventional syngas loop boiler, base material selection is done according to API 941 "Nelson Curves" in order to be high temperature hydrogen resistant.

Ammonia contact with steel at a temperature above 380° C. leads to steel nitriding, resulting in hardness increasing and risk of high temperature hydrogen attack. Therefore, in a syngas loop boiler the tube-sheet syngas surface is usually protected by an Inconel® weld overlay. As is known, Inconel® is a family of austenitic nickel-chromium-based superalloys or high-performance alloys. Inconel® alloys are oxidation- and corrosion-resistant materials well suited for service in extreme environments subjected to pressure and heat. When heated, Inconel® forms a thick, stable, passivating oxide layer protecting the surface from further attack.

According to the prior art, thick tube-sheet holes (diameter down to 28 mm in tube-sheet thickness up to 500 mm) are protected by an internal sleeve welded at both ends, as per some process licensor specifications. The first Inconel® sleeve weld is usually performed between the Inconel® weld overlay, whereas the second Inconel® sleeve weld is usually performed between the Inconel® sleeve and the tube-sheet material (by inner-bore welding technique).

For example, document U.S. Pat. No. 7,574,981 B1 describes a tubular boiler having ferrules inserted into the tubes. An internal weld overlay of a corrosion-resistant material is deposited in a band about the inner wall of each tube. The overlay has an annular inner recess receiving the end of the ferrule.

Document U.S. Pat. No. 4,401,153 A describes a shell and tube heat exchanger having a protective sleeve of nitriding-resistant material inside the tubes. The protective sleeve is welded to the lower end of an outer tubular sleeve.

Document U.S. Pat. No. 8,210,245 B2 describes a shell and tube heat exchanger wherein at least a portion of the inlet tube plate is covered by wear-resistant inserts. The inserts can be at least partially inserted into the heat exchanger tubes. The inserts consist of protective sleeves welded to the inlet tube plate.

Document US 2013/0199462 A1 describes a repair sleeve made of Inconel® for a steam generator that is welded to the tube end. The old defective weld seam is first removed and then a new milling contour is formed with a depression for accommodation and subsequent welding of the repair sleeve to the flange region.

Document U.S. Pat. No. 3,540,529 A describes a tubular heat exchanger using Inconel® as the welding material for joining the tubes to the tube-sheet. However, no protection sleeves are provided in the tubes.

Finally, document U.S. Pat. No. 2,785,459 A describes how to make a tube seal by using a weld deposit in a groove of the base material which during fusion welding will leave the base material unaffected.

A disadvantage of the welded sleeves is due to the fact that the sleeve weldment to the tube-sheet base material needs to be heat treated. For this reason it is practically impossible to replace a sleeve at site or to remove a sleeve for tube-sheet base material inspection. The post weld heat treatment (PWHT) process at site is so complicate and expensive to be considered nearly impossible.

SUMMARY OF THE INVENTION

One object of the present invention is therefore to provide an apparatus and a method for protecting the tube-sheet of a syngas loop boiler which are capable of resolving the abovementioned drawbacks of the prior art in a simple, inexpensive and particularly functional manner.

In detail, one object of the present invention is to provide an apparatus and a method for protecting the tube-sheet of a syngas loop boiler that allows the sleeves to be removed (on random base) for checking the tube-sheet base material integrity and then to be re-installed by welding without performing any post weld heat treatment (PWHT) process.

Another object of the present invention is to provide an apparatus and a method for protecting the tube-sheet of a syngas loop boiler that, during boiler periodical maintenance, allows the sleeve welds to be checked. If the sleeve welds are found to be defective, re-welding is possible without the need to repeat the PWHT process.

These objects are achieved according to the present invention by providing an apparatus and a method for protecting the tube-sheet of a syngas loop boiler as set forth in the attached claims.

It should be pointed out that the scope of the apparatus for protecting the tube-sheet of a syngas loop boiler according to the present application is not to protect the tubes of the tube-sheet at the location shown in document U.S. Pat. No. 7,574,981 B1. On the contrary, the scope of the apparatus for protecting the tube-sheet of a syngas loop boiler according to the present application is to permit welding of the ferrule tube to the tube-sheet material without the need to heat treat the weldment. The tube-sheet base material (usually grade 22 ferritic steel) requires post weld heat treatment after welding in order to lower the weld stress and to achieve tempered structures. According to the present application, the Inconel® buttering is post weld heat treated after deposition, then the subsequent installation, removal and re-welding of a new ferrule can be done without further post weld heat treatment (PWHT) process.

Further characteristics of the invention are underlined by the dependent claims, which are an integral part of the present description.

BRIEF DESCRIPTION OF THE DRAWINGS

The characteristics and advantages of an apparatus and a method for protecting the tube-sheet of a syngas loop boiler according to the present invention will be clearer from the following exemplifying and non-limiting description, with reference to the enclosed schematic drawings, in which.

DETAILED DESCRIPTION OF THE PREFERRED EMBODIMENT

With reference to the figures, one embodiment of an apparatus for protecting the tube-sheet of a syngas loop boiler according to the present invention is shown. The syngas loop boiler 10 is of the type comprising a casing 12 that surrounds a tube bundle 14. Although the syngas loop boiler 10 is shown in a horizontal orientation, it may also be oriented vertically or at any angle with respect to a horizontal surface.

The tube bundle 14 comprises a plurality of tubes 16. The tubes 16 are preferably U-shaped tubes, but the apparatus and the method according to the present invention can also be applied to tube bundles with straight tubes. One end of each of the tubes 16 is joined to a tube-sheet 18 provided with corresponding tube-sheet inlet holes 20 for inletting the syngas in the boiler 10. In case of U-shaped tubes, the other end of each of the tubes 16 is joined to the tube-sheet 18, which then is provided with tube-sheet outlet holes for outletting the syngas. In case of straight tubes, the other end of each of the tubes is joined to another tube-sheet provided with tube-sheet outlet holes for outletting the syngas. The tube-sheet 18 can be typically manufactured with a grade F11, F12, F21, F22, F22V or equivalent low alloy steel, preferably with a grade F22 low alloy steel.

Each tube-sheet inlet hole 20 is internally provided with at least a protective sleeve 22 welded at both ends to corresponding surfaces of said tube-sheet inlet hole 20. Each protective sleeve 22 can be typically manufactured with an austenitic nickel-chromium-based superalloy known with the Inconel® brand name.

Figure 2:
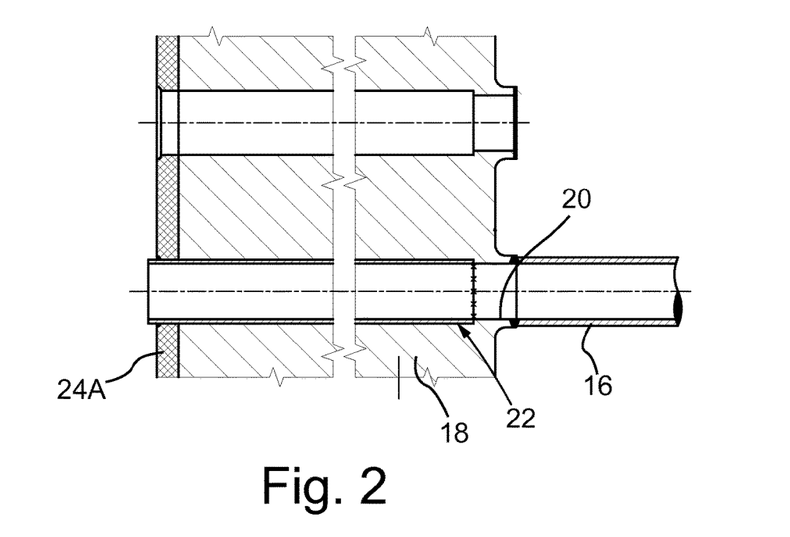
FIG. 2 is a sectional view of a sleeve for protecting the tube-sheet of a syngas loop boiler according to the prior art.
Figure 3:
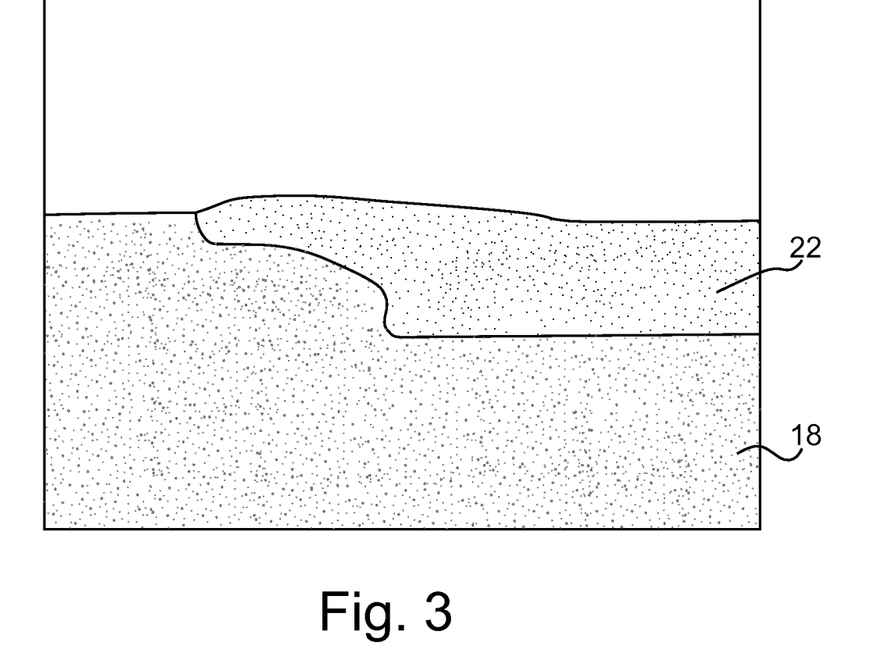
FIG. 3 is an enlarged view of the sleeve of FIG. 2, wherein a macro section of the weld between the sleeve and the tube-sheet hole is shown. The weld involves the Inconel® sleeve and the grade F22 tube-sheet material.

For example, FIGS. 2 and 3 show a welding configuration according to the prior art, wherein at least one end of the Inconel® protective sleeve 22 is directly welded to the F22 material of the tube-sheet 18. This weld needs to be post weld heat treated, in order to temper the heat affected zone of the tube-sheet 18 base material to achieve hardness values suitable for $H_2$ service (usually reference hardness values are those suggested by API 934 practice).

Figure 4:
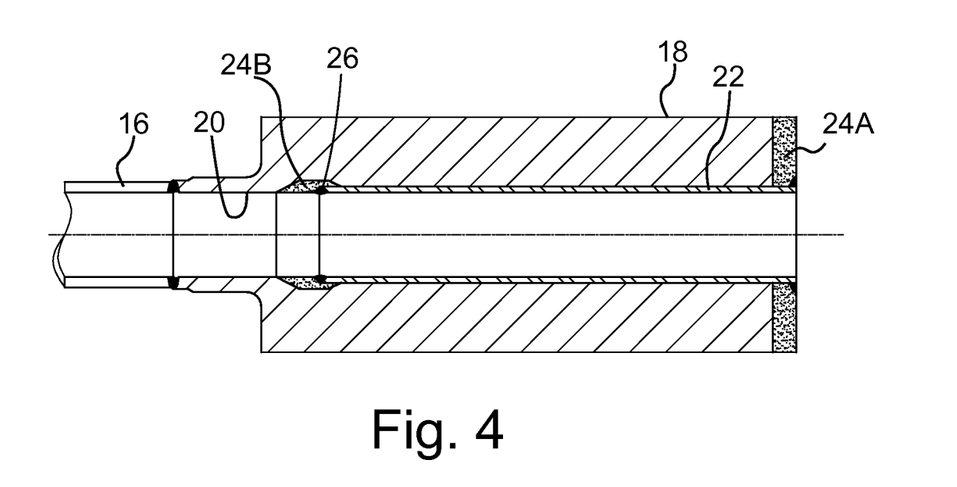
FIG. 4 is a sectional view of an apparatus for protecting the tube-sheet of a syngas loop boiler according to the present invention.
Figure 5:
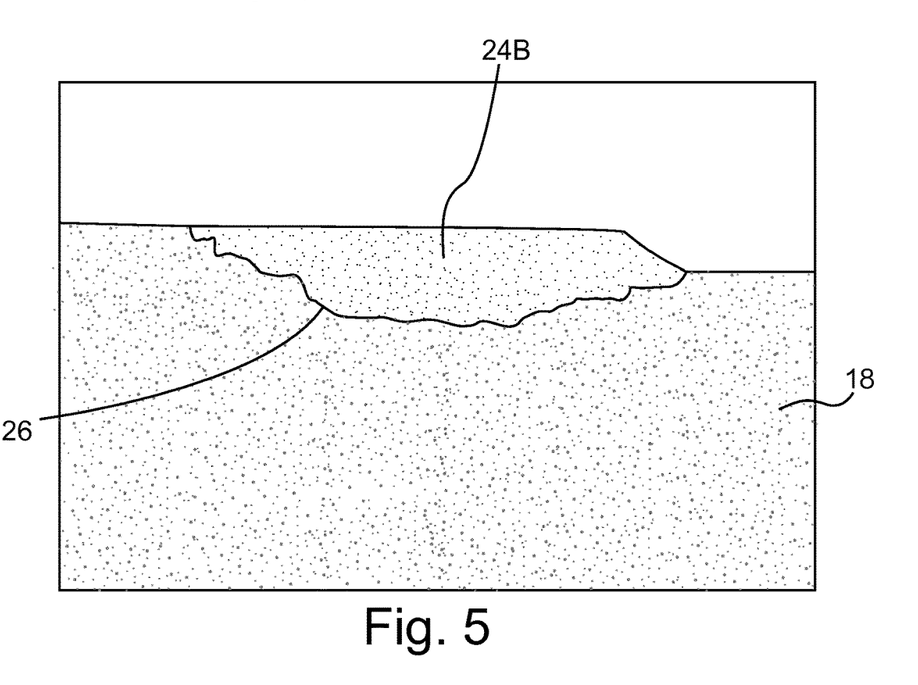
FIG. 5 is an enlarged view of an in-bore weld overlay of the apparatus of FIG. 4, wherein a macro section of an Inconel® weld overlay inside the tube-sheet hole is shown. In this step the weld overlay is pre-machined to cylindrical shape, so as to allow the volumetric examination by a dedicated ultrasonic probe in order to detect possible weld defects.
Figure 6:
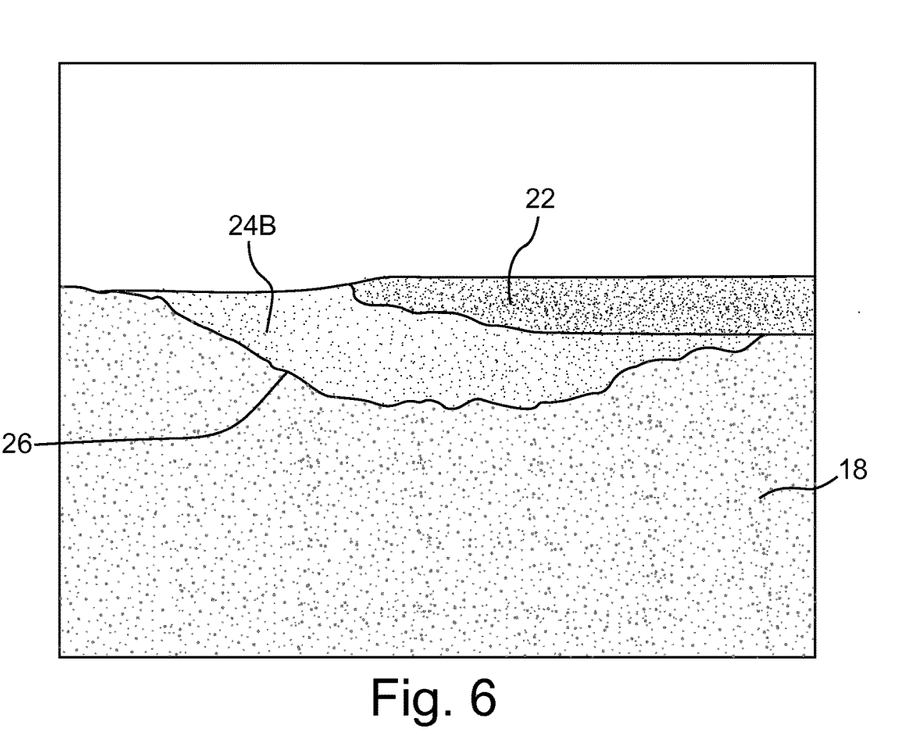
FIG. 6 is an enlarged view of a sleeve welded to an in-bore weld overlay of the apparatus of FIG. 4, wherein a macro section of the finished weld between the sleeve and the weld overlay inside the tube-sheet hole is shown. It should be noted that the sleeve weld does not affect the grade F22 tube-sheet base material, being the weld and its affected zone completely inside the weld overlay. This allows future re-welding without performing any PWHT process.

FIGS. 4-6 show a welding configuration according to the present invention, wherein at least one in-bore weld overlay 24B is installed inside each tube-sheet inlet hole 20. More precisely, in a per se known manner, each tube-sheet inlet hole 20 is provided with a first respective weld overlay 24A placed at the inlet mouth of said tube-sheet inlet hole 20, so that a first end of each protective sleeve 22 is welded to said first weld overlay 24A. Additionally, according to the present invention, each tube-sheet inlet hole 20 is internally provided with at least a bore groove 26 that contains a respective in-bore second weld overlay 24B, so that the second end of each protective sleeve 22 is welded to said in-bore second weld overlay 24B.

Each weld overlay 24A, 24B is preferably manufactured with the Inconel® superalloy, or with an austenitic steel or nickel based alloy, and is preferably provided at both ends of the Inconel® protective sleeve 22. In other words, each Inconel® protective sleeve 22 results welded at both ends to respective Inconel® weld overlays 24A, 24B, with the possibility of removal and re-installation without performing any post weld heat treatment (PWHT) process.

With reference to FIGS. 5 and 6, the second Inconel® weld overlay heat affected zone in the base material of the tube-sheet 18 is heat treated during boiler 10 manufacturing. The weld between the Inconel® protective sleeve 22 and the in-bore second Inconel® weld overlay 24B does not need heat treatment, being its heat affected zone entirely in said in-bore second Inconel® weld overlay 24B without affecting the base material.

Figure 7A:
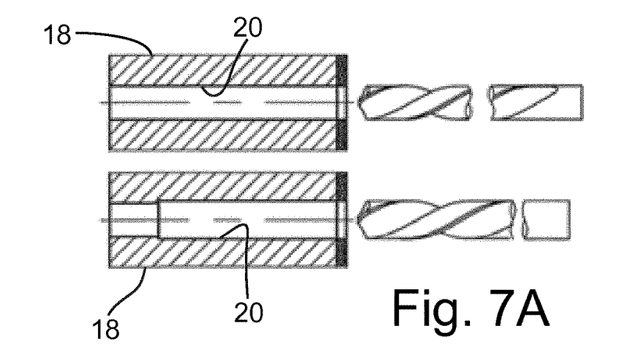
FIGS. 7A-7G show the manufacturing sequence of the tube-sheet and the respective weld overlay obtained inside the tube-sheet hole.
Figures 7B, 7C, 7F, 7G:
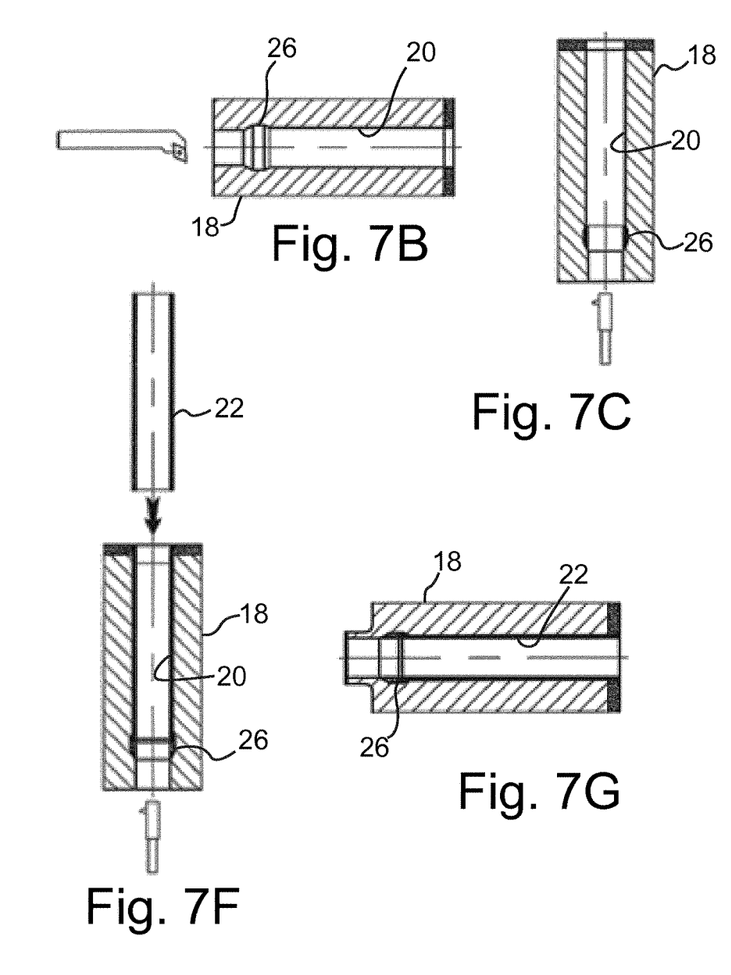

Manufacturing the new solution involved developing new weld procedures to deposit the in-bore second Inconel® weld overlay 24B inside the bore groove 26 and to weld the Inconel® protective sleeve 22 to said in-bore second Inconel® weld overlay 24B. The method for inserting and welding the in-bore second Inconel® weld overlay 24B inside the bore groove 26 of the tube-sheet 18 comprises the preliminary step of obtaining at least a tube-sheet inlet hole 20 in said tube-sheet 18, as shown in FIG. 7A. Each tube-sheet inlet hole 20 is preferably obtained by drilling of the tube-sheet 18. Subsequently, at least a bore groove 26 is obtained inside each tube-sheet inlet hole 20 by groove machining, as shown in FIG. 7B.

Figure 8:
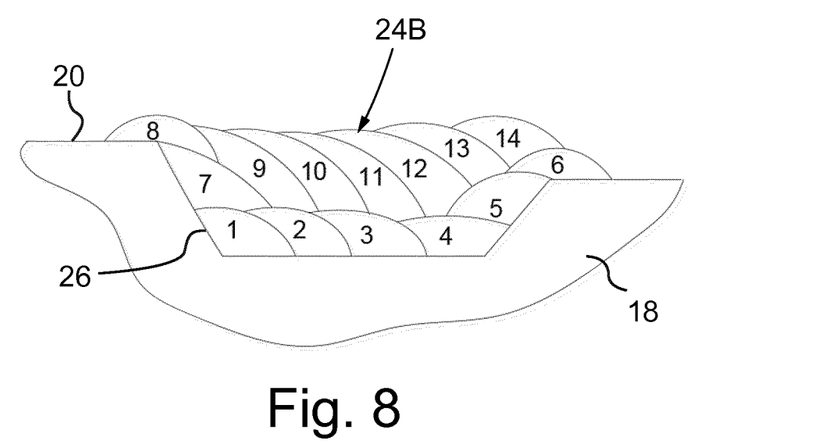
FIG. 8 is an enlarged view of the tube-sheet, showing a manufacturing step of the weld overlay.

The in-bore second Inconel® weld overlay 24B is then deposited into a corresponding bore groove 26 by welding, preferably by a multiple pass welding process. This procedure is shown in FIG. 7C and, in greater detail, in FIG. 8. For example, as shown in FIG. 8, the deposited second Inconel® weld overlay 24B can be obtained by at least 5 weld passes according to a predetermined welding sequence and can have a thickness greater than 4.5 mm.

Figure 7D:
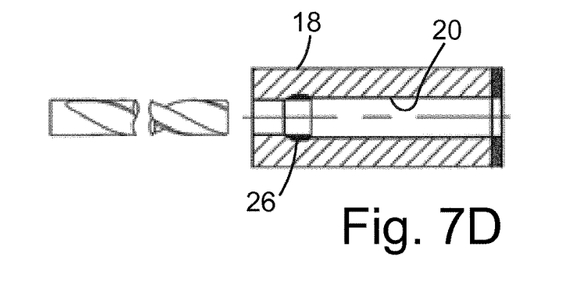

Preferably, the in-bore second Inconel® weld overlay 24B is pre-machined to a cylindrical shape, as shown in FIG. 7D. This operation, as well as facilitating the insertion of the Inconel® protective sleeve 22 into the tube-sheet inlet hole 20, is required to perform the Inconel® weld overlay 24B ultrasonic testing (UT), as here below described.

A non-destructive testing (NDT) procedure has been developed in order to check the second Inconel® weld overlay 24B. In detail, after the in-bore second Inconel® weld overlay 24B deposition and after the respective pre-machining, said in-bore second Inconel® weld overlay 24B is inspected by an ultrasonic testing (UT) performed through a customized automatic UT probe (not shown). The UT probe gives a C-scan representation of the in-bore second Inconel® weld overlay 24B and is performed for lack of bond detection.

More precisely, the UT probe could be equipped with two tandem crystals, transmitter and receiver, and could be positioned inside the tube-sheet inlet hole 20 at the bore groove 26, on the longitudinal axis. The UT probe moves following an helix path with a pitch of 0.5 mm. The UT probe shall be moved on the bore internal surface and it must cover the complete in-bore second Inconel® weld overlay 24B surface.

The ultrasonic data obtained by the UT probe are processed and stored in unprocessed form. During scanning, the scan images can be built-up on-line. After finalizing a scan, data shall be evaluated and documented, which can be performed off-line. The final results are presented in terms of position, length and depth location of the reflector in relation to the weld section.

A preliminary calibration process of the UT probe may be performed using a specific calibration block 28 (FIG. 9), that simulates a tube-sheet inlet hole provided with the bore groove and the in-bore second Inconel® weld overlay. The weld overlay shape and main dimensions of the calibration block 28 are substantially identical to the corresponding ones obtained on the tube-sheet 18 of the syngas loop boiler 10. Additionally, the calibration block 28 is manufactured with the same material grade and form of the tube-sheet 18 of the syngas loop boiler 10.

Figure 9:
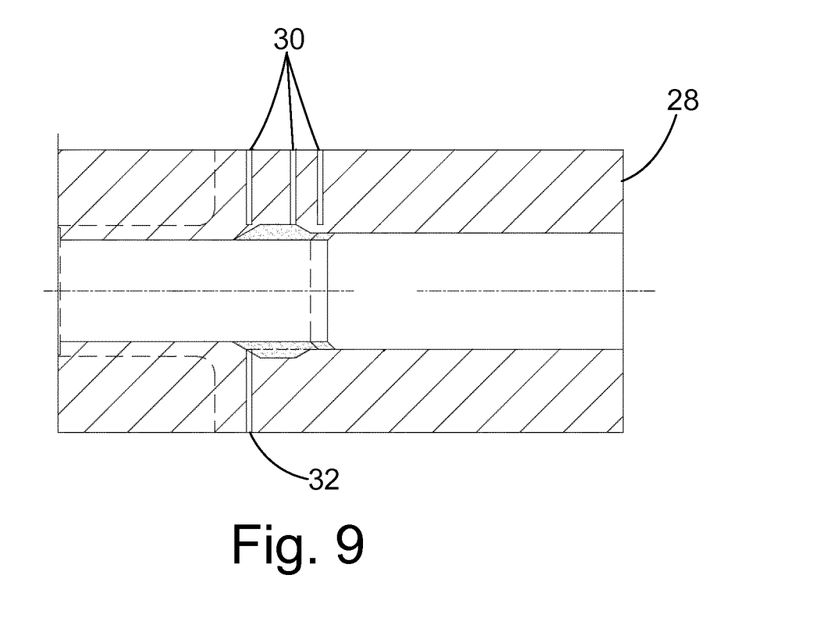
FIG. 9 shows a calibration block that simulates a tube-sheet hole provided with the weld overlay. The calibration block can be used for performing tests using the ultrasonic probe.

The calibration block 28 is provided with a plurality of calibration and/or verification holes 30, obtained at the respective weld overlay. Scanning range calibration shall be set in order to detect clearly all the holes 30, 32 of the calibration block 28. The scanning range shall be set out in the UT probe software.

Figure 7E:
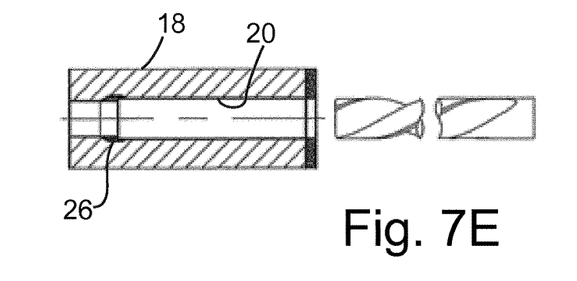
Figure 10:
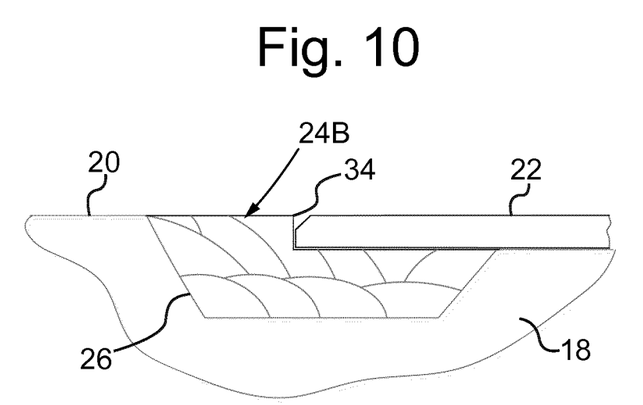
FIG. 10 is another enlarged view of the tube-sheet, showing a further manufacturing step of the weld overlay, i.e. the weld between the sleeve and the Inconel® weld overlay.

The in-bore second Inconel® weld overlay 24B is then final machined (FIG. 7E) to create a respective welding bevel 34 (FIG. 10). The protective sleeve 22 is inserted, e.g. by hand, in the tube-sheet inlet hole 20 and is then welded, at a second end thereof, to the in-bore second Inconel® weld overlay 24B (FIGS. 7F and 7G). The protective sleeve 22 is thus expanded inside the tube-sheet inlet hole 20.

After final machining step of the in-bore second Inconel® weld overlay 24B, both the in-bore second weld overlay 24B surface and the protective sleeve 22, once welded to said in-bore second Inconel® weld overlay 24B, can be checked by penetrant test (PT) adopting an optical inspection device for developer application, comprising for example a borescope. The weld between the protective sleeve 22 and the in-bore second Inconel® weld overlay 24B can be both a full or a partial fusion weld according to the specific requests.

In case the weld between the protective sleeve 22 and the in-bore second Inconel® weld overlay 24B is obtained by a full fusion welding process, then a sophisticated ultrasonic testing (UT) examination of the weld is possible. The ultrasonic testing is performed by a special bore probe operating UT creep waves and giving an A-scan representation. The ultrasonic testing can detect both surface and root defects.

The manufacturing process is completed by the welding of the first weld overlay 24A at the first end of the protective sleeve 22, as well as by the welding of the tubes 16 to the tube-sheet 18 by inner bore welding technique. The boiler 10 is then completed in a manner known per se and the post weld heat treatment (PWHT) process can be performed.

It is thus seen that the apparatus and the method for protecting the tube-sheet of a syngas loop boiler according to the present invention achieves the previously outlined objects, in particular obtaining the following advantages:
- the possibility of removal and re-installation of the sleeve without performing any post weld heat treatment (PWHT) process;
- the possibility of site repair of the sleeve weld in case of failure; and
- the possibility of site removal and replacement of the sleeve for the inspection of the tube-sheet base material.

The apparatus and the method for protecting the tube-sheet of a syngas loop boiler of the present invention thus conceived are susceptible in any case of numerous modifications and variants, all falling within the same inventive concept; in addition, all the details can be substituted by technically equivalent elements. In practice, the materials used, as well as the shapes and size, can be of any type according to the technical requirements.

The protective scope of the invention is therefore defined by the enclosed claims.

The invention claimed is:

1. A syngas loop boiler comprising:
a tube bundle; and
a casing that surrounds the tube bundle,
wherein said tube bundle comprises a plurality of tubes,
wherein one end of each of the plurality of tubes is joined to a tube-sheet provided with a plurality of tube-sheet inlet holes for inletting syngas in the boiler, and
wherein a first tube-sheet inlet hole of the plurality of tube-sheet inlet holes is provided with:
 a protective sleeve welded at both ends to said first tube-sheet inlet hole,
 a first weld overlay placed at an inlet mouth of said first tube-sheet inlet hole, the first weld overlay encircling a first end of the protective sleeve so that the first end of the protective sleeve is welded to said first weld overlay, and a bore groove that contains a second weld overlay, the second weld overlay having a first end and a second end spaced from the first end in an axial direction of the protective sleeve, the second overlay encircling and directly contacting a second end of the protective sleeve so that the second end of the protective sleeve is between the first end and second end of the second weld overlay, wherein the second weld overlay is spaced from the first weld overlay in the axial direction of the protective sleeve.

2. The syngas loop boiler according to claim 1, wherein the tube-sheet is manufactured with a material selected in the group consisting of:
grade F11 alloy steel;
grade F12 alloy steel;
grade F21 alloy steel;
grade F22 alloy steel; and
grade F22V alloy steel.

3. The syngas loop boiler according to claim 1, wherein the protective sleeve is manufactured with an austenitic nickel-chromium-based superalloy.

4. The syngas loop boiler according to claim 1, wherein the first weld overlay and the second weld overlay are each manufactured with an austenitic steel or nickel based alloy.

5. The syngas loop boiler according to claim 1, wherein said plurality of tubes are U-shaped tubes.

6. A method for inserting and welding a protective sleeve in a corresponding tube-sheet inlet hole of the syngas loop boiler according to claim 1, the method comprising the steps of:
obtaining the first tube-sheet inlet hole in the tube-sheet of the syngas loop boiler;
obtaining the bore groove inside the first tube-sheet inlet hole by groove machining;
depositing the second weld overlay into the bore groove by welding;
inserting the protective sleeve into the first tube-sheet inlet hole;
welding of the protective sleeve, at a second end thereof, to the second weld overlay; and
welding of the protective sleeve, at a first end thereof, to the first weld overlay.

7. The method according to claim 6, wherein said second weld overlay is welded to the bore groove by a multiple pass welding process.

8. The method according to claim 7, wherein the second weld overlay is obtained by at least 5 weld passes according to a predetermined welding sequence.

9. The method according to claim 6, wherein the second weld overlay has a thickness greater than 4.5 mm.

10. The method according to claim 6, wherein the first tube-sheet inlet hole is obtained by drilling of the tube-sheet.

11. The method according to claim 6, wherein, after the second weld overlay deposition step and before the protective sleeve insertion step, a pre-machining step of the second weld overlay to a cylindrical shape is performed for facilitating the insertion of said protective sleeve into the first tube-sheet inlet hole.

12. The method according to claim 11, wherein, after the pre-machining step, a final machining step of the second weld overlay is performed to create a welding bevel.

13. The method according to claim 11, wherein, after the second weld overlay deposition step and after the pre-machining step, a non-destructive testing (NDT) procedure is performed in order to check the second weld overlay, wherein said second weld overlay is inspected by an ultrasonic testing (UT) performed through a UT probe.

14. The method according to claim 13, wherein a preliminary calibration process of the UT probe is performed using a calibration block that simulates a tube-sheet inlet hole provided with a bore groove and an in-bore second weld overlay,
wherein a weld overlay shape and main dimensions of the calibration block are substantially identical to ones obtained on the tube-sheet of the syngas loop boiler, and
wherein the calibration block is manufactured with the same material grade and form of said tube-sheet.

15. The method according to claim 12, wherein, after the second weld overlay final machining step, both the second weld overlay surface and the protective sleeve, once welded to said second weld overlay, are checked by a penetrant test (PT) adopting an optical inspection device.

16. The loop boiler according to claim 1, wherein the first tube-sheet inlet hole of the plurality of tube-sheet inlet holes extends between a first surface of the tube-sheet and a second surface of the tube-sheet, and
wherein the bore groove is between and spaced from the first surface of the tube-sheet and the second surface of the tube-sheet.

* * * * *